US008002415B2

(12) United States Patent
Nakamura

(10) Patent No.: US 8,002,415 B2
(45) Date of Patent: Aug. 23, 2011

(54) PROJECTION-TYPE IMAGE DISPLAY DEVICE WITH COOLING MECHANISM

(75) Inventor: Takahiro Nakamura, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 379 days.

(21) Appl. No.: 12/236,094

(22) Filed: Sep. 23, 2008

(65) Prior Publication Data

US 2009/0086169 A1 Apr. 2, 2009

(30) Foreign Application Priority Data

Sep. 28, 2007 (JP) ................................ 2007-255729

(51) Int. Cl.
*G03B 21/18* (2006.01)

(52) U.S. Cl. ........................................... 353/54; 353/52

(58) Field of Classification Search .................... 353/52, 353/53, 54, 55, 56, 57, 58, 59, 60, 61; 348/748; 362/218, 294, 345, 373, 547; 165/60, 63, 165/64, 65, 66
See application file for complete search history.

(56) References Cited

U.S. PATENT DOCUMENTS

| | | | | |
|---|---|---|---|---|
| 5,501,267 | A * | 3/1996 | Iritani et al. | 165/202 |
| 7,334,898 | B2 * | 2/2008 | Seto et al. | 353/61 |
| 7,543,962 | B2 * | 6/2009 | Miwa et al. | 362/294 |
| 7,578,595 | B2 * | 8/2009 | Miwa et al. | 353/54 |
| 2003/0102113 | A1 * | 6/2003 | Memory et al. | 165/152 |
| 2005/0201107 | A1 * | 9/2005 | Seki | 362/373 |
| 2006/0044524 | A1 * | 3/2006 | Feliss et al. | 353/54 |
| 2006/0279706 | A1 * | 12/2006 | Bash et al. | 353/54 |

FOREIGN PATENT DOCUMENTS

| | | |
|---|---|---|
| JP | 2005-026575 | 1/2005 |
| JP | 2007-201285 | 8/2007 |

* cited by examiner

*Primary Examiner* — Georgia Y Epps
*Assistant Examiner* — Bao-Luan Le
(74) *Attorney, Agent, or Firm* — McDermott Will & Emery LLP

(57) ABSTRACT

A projection-type image display device generates projection light by modulating light beams of at least three primary colors in accordance with image information and synthesizing the modulated light beams. The display device includes a light source unit constituted by arranging a plurality of light source elements each having light source arrays being arranged on heat receiving plates respectively so as to conduct the light beams of the colors to irradiation surfaces of a synthesizing prism, a refrigerating unit including at least a refrigerant compressor, a condenser, a pressure reducing unit and a refrigerant pipe constituting an evaporator, and an air cooling device lower in cooling capacity than the refrigerating unit. Of the plural light source arrays, those relatively large in the amount of heat generated are connected to the refrigerating unit, while the others are connected to the air cooling unit.

6 Claims, 5 Drawing Sheets

PROJECTION-TYPE IMAGE DISPLAY DEVICE WITH COOLING MECHANISM

BACKGROUND OF THE INVENTION

1. Field of the Invention

The present invention relates to an improvement of a light source unit adopting light source arrays in a projection type image display device (projector) which is for modulating light beams of three primary colors in accordance with image information, synthesizing the modulated light beams to generate projection light and projecting an image onto a screen through a projection lens.

2. Description of the Related Art

In many conventional projection type image display devices, a discharge lamp such as a metal halide lamp or an ultra-high pressure mercury lamp is adopted as a light source for generating light beams of three primary colors. In case of using a so-called 3-CCD, white light emitted from a discharge lamp is separated into the three primary colors of red (R), green (G) and blue (B) by means of a dichroic mirror, and then the three primary colors are modulated in accordance with image information and synthesized by means of a synthesizing prism (dichroic prism), and thereafter, an image is displayed onto a screen through a projection lens.

To meet the demand for high luminance (high output) in such a projection type image display device using a discharge lamp, there has been made an attempt to adopt a discharge lamp of a high output or use multiple lamps. However, such an attempt results in an increase in the amount of heat generated from the discharge lamp, thus leading to an increase in size of a cooling structure. Measures for increasing the size of a noise preventing structure and that of a power supply, for example, also become essential. Moreover, since a light emission spectrum of the discharge lamp has a peak in yellow color, it is necessary to mix yellow color with red or green color for utilizing its output light effectively. Thus, there has been the problem that the resulting monochrome is poor in color purity and high color reproducibility cannot be attained. Further, in the discharge lamp, the quantity of light in the wavelength band of red color is not sufficient as compared with the quantity of light in the wavelength band of green color and that of blue color in a light emission spectrum, thus giving rise to the problem that it is necessary to take some measures for compensating the quantity of light in the wavelength band of red color.

As to the projection type image display device adopting the discharge lamp, despite the existence of the above-mentioned problems, there has been recently a growing demand for increasing the size of an image projected onto a screen, for example, in the business market and accordingly it is now the market's needs to increase the quantity of light. For solving the above-mentioned problems encountered in case of adopting the discharge lamp, attempts are being made to adopt a semiconductor laser array as a light source element intended for a high output (refer to Japanese Patent Laid-Open Publication No. 2007-201285).

The semiconductor laser array is, for example, an array of several ten or more monolithic semiconductor lasers arranged in high density on one and same semiconductor substrate, in which light emitting spots in a number corresponding to the arrayed number of semiconductor elements are formed. In case of adopting such a semiconductor laser array, it is an important subject to keep a set temperature for laser operation constant in order to ensure stable laser oscillation of each semiconductor laser in the semiconductor laser array.

If the set temperature for laser operation varies, the emission output from the semiconductor laser array varies, thus exerting an influence on the result of color synthesis and leading to shortening of the service life. In view of this point, according to the technique disclosed in Japanese Patent Laid-Open Publication No. 2007-201285, a Peltier device and a heat sink are combined to cool the semiconductor laser array. As another means for cooling the semiconductor laser array forcibly, there has been proposed means in which a coolant passage extending from a cooling device is disposed in parallel with the semiconductor laser array to cool the same array to a predetermined temperature (refer to Japanese Patent Laid-Open Publication No. 2005-026575).

SUMMARY OF THE INVENTION

Using the semiconductor laser array as a light source is advantageous in that, as compared with the discharge lamp, instantaneous ON/OFF can be done, color reproducibility is wide and a long life is ensured. However, in the case of a semiconductor laser, as the temperature rises, the light emission efficiency is deteriorated and the number of crystal defects increases. As a result, the ratio of non-radiative transition increases. Therefore, heat is generated also in a transition mechanism which operates as the original emission principle, so that the laser temperature rises and the light emitting capacity is deteriorated in an accelerated manner, thus leading to shortening of the service life.

The present invention premises a structure for synthesizing three primary colors emitted from semiconductor laser arrays of plural semiconductor lasers having such optical properties as described above. However, as noted above, the semiconductor laser possesses a property of being greatly influenced by temperature, and if the laser temperature changes, the wavelength and luminance of output light also change. In this state, the white balance is lost and it becomes impossible to make an accurate color gradation representation.

Accordingly, it is necessary that the semiconductor laser array be held constantly at a certain preset operating temperature capable of maintaining a stable operation. For example, since each semiconductor laser attains a high output and can ensure a long life at a relatively lower temperature than room temperature, it is necessary to provide cooling means which keeps constant the set temperature for operation of each semiconductor laser array no matter how the ambient temperature may change, and it is necessary to control the set temperature strictly within a specified range.

However, the cooling means disclosed in Japanese Patent Laid-Open Publication No. 2007-201285 uses a combined structure of a Peltier device and a heat sink, resulting in that the peripheries of light source elements become complicated and large-sized. Therefore, light source elements of plural semiconductor laser arrays for three primary colors cannot be adopted, nor can the temperature of each semiconductor laser array can be accurately controlled. In the cooling means disclosed in Japanese Patent Laid-Open Publication No. 2005-026575, not only it is difficult to grasp the temperature of each semiconductor laser array, but also the apparatus concerned becomes extremely large-scaled such that means for adjusting the flow rate of coolant is provided for each semiconductor laser array.

In case of adopting semiconductor lasers in light source arrays for obtaining light beams of three primary colors, when the semiconductor lasers of the primary colors are turned ON so as to emit light beams of the primary colors each at a predetermined quantity of light, the semiconductor lasers of the primary colors generate heat in a different manner. For example, for allowing the semiconductor lasers of red color to emit light to about the same degree as the semiconductor lasers of green and blue colors, a relatively large operating current is needed and therefore the amount of heat generated also increases.

Accordingly, when consideration is given to stable emission of light and deterioration of semiconductor lasers in cooling the light source elements of the primary colors, cooling must be performed so that the light source arrays of red semiconductor lasers which are put in the strictest condition for temperature control operate stably. However, if the other light source elements of green and blue semiconductor lasers are also cooled at the same time on the basis of the stably operating temperature of the red semiconductor lasers, they do not generate so much heat as the red semiconductor lasers do, resulting in supercooling and the occurrence of variation, for example, in the amount of light emitted. Thus, it is impossible to cool all the light source elements uniformly.

Therefore, in case of cooling all the light source elements of red, green and blue semiconductor lasers with use of one and same cooling means, it is necessary for the cooling means to control temperature so that the light source elements of the primary colors are each cooled to a predetermined temperature. Thus, it is necessary to provide such a function as permits temperature control for the light source elements each in an individual manner, thus resulting in the complicated structure of the cooling means. Moreover, in case of cooling the light source elements of the primary colors, if all of them are cooled by a refrigerating machine, the machine becomes large-sized, thus causing an increase in the manufacturing cost and the electric power cost.

The present invention adopts the following means to solve the above-mentioned problems. In a first aspect of the present invention, there is provided a projection type image display device for modulating light beams of at least three primary colors in accordance with image information and synthesizing the modulated light beams to attain projection light, the projection type image display device comprising a light source unit constituted by arranging a plurality of light source elements hierarchically so as to conduct the light beams of the colors to irradiation surfaces of a synthesizing prism, the light source elements comprising light source arrays each of plural light emitting elements arranged on one and same substrate, the light source arrays being arranged on heat receiving plates respectively; refrigerating means including at least a refrigerant compressor, a condenser, a pressure reducing device and a refrigerant pipe constituting an evaporator; and auxiliary cooling means less in cooling capacity than the refrigerating means, in which, of the plural light source arrays, those relatively much in the amount of heat generated are connected to the refrigerating means, while the others are connected to the auxiliary cooling means.

In a second aspect of the present invention, there is provided the projection type image display device according to the above first aspect, in which the light source elements of the light source arrays emitting red color are connected to the refrigerating means.

In a third aspect of the present invention, there is provided the projection type image display device according to the first aspect, in which the auxiliary cooling means is an air cooling device.

According to the present invention, since light source elements relatively large in the amount of heat generated are connected to the refrigerating means and the other light source arrays are connected to the auxiliary cooling means, it becomes possible to decrease the size of the refrigerating means and a complicated temperature adjustment is no longer required. Consequently, it is possible to reduce the manufacturing cost and the electric power cost and provide a projection type image display device which permits light source elements to emit light stably.

DETAILED DESCRIPTION OF THE PREFERRED EMBODIMENT

Figure 1:
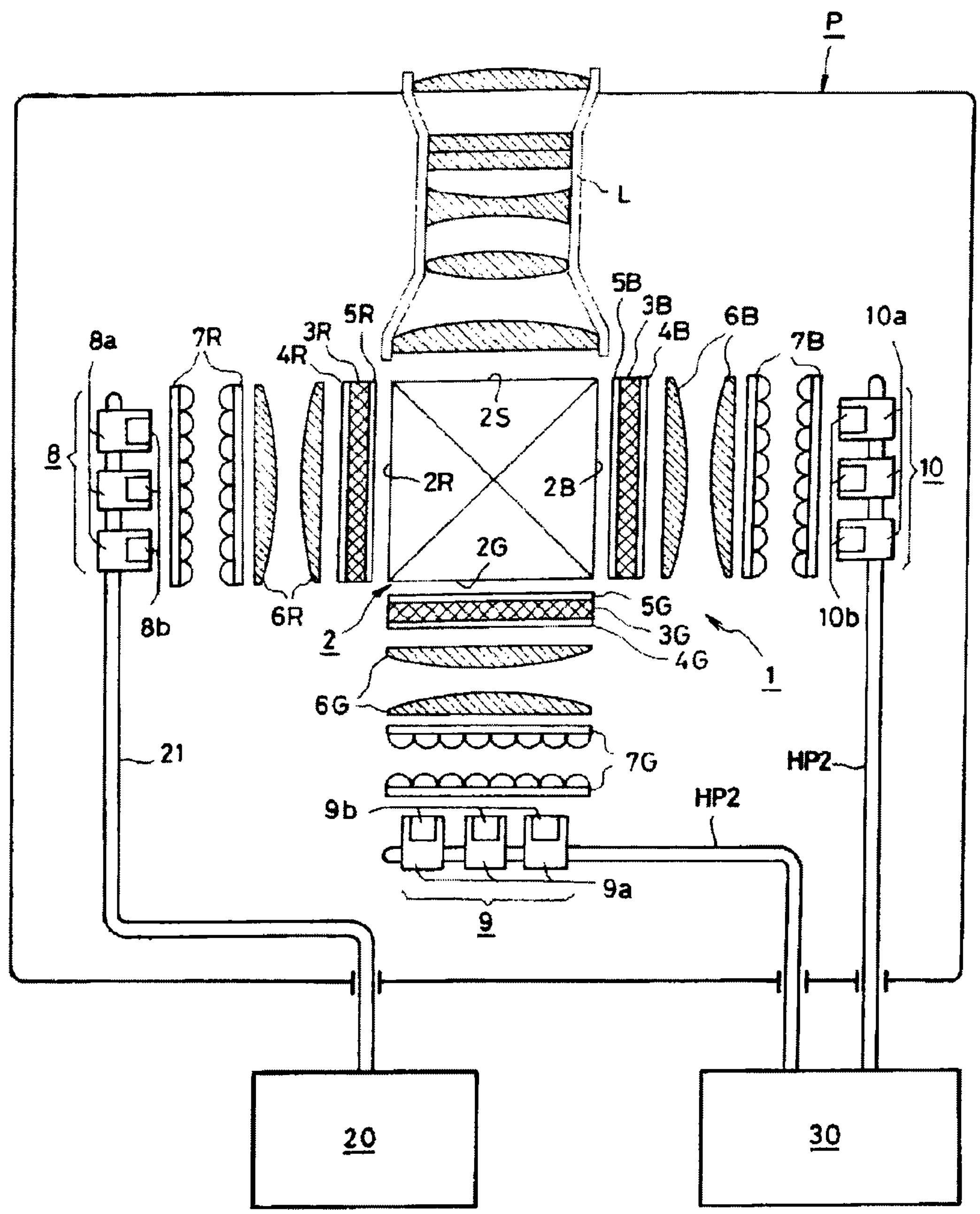
FIG. 1 is a plan view showing a structure of a light source unit according to the present invention.
Figure 2:
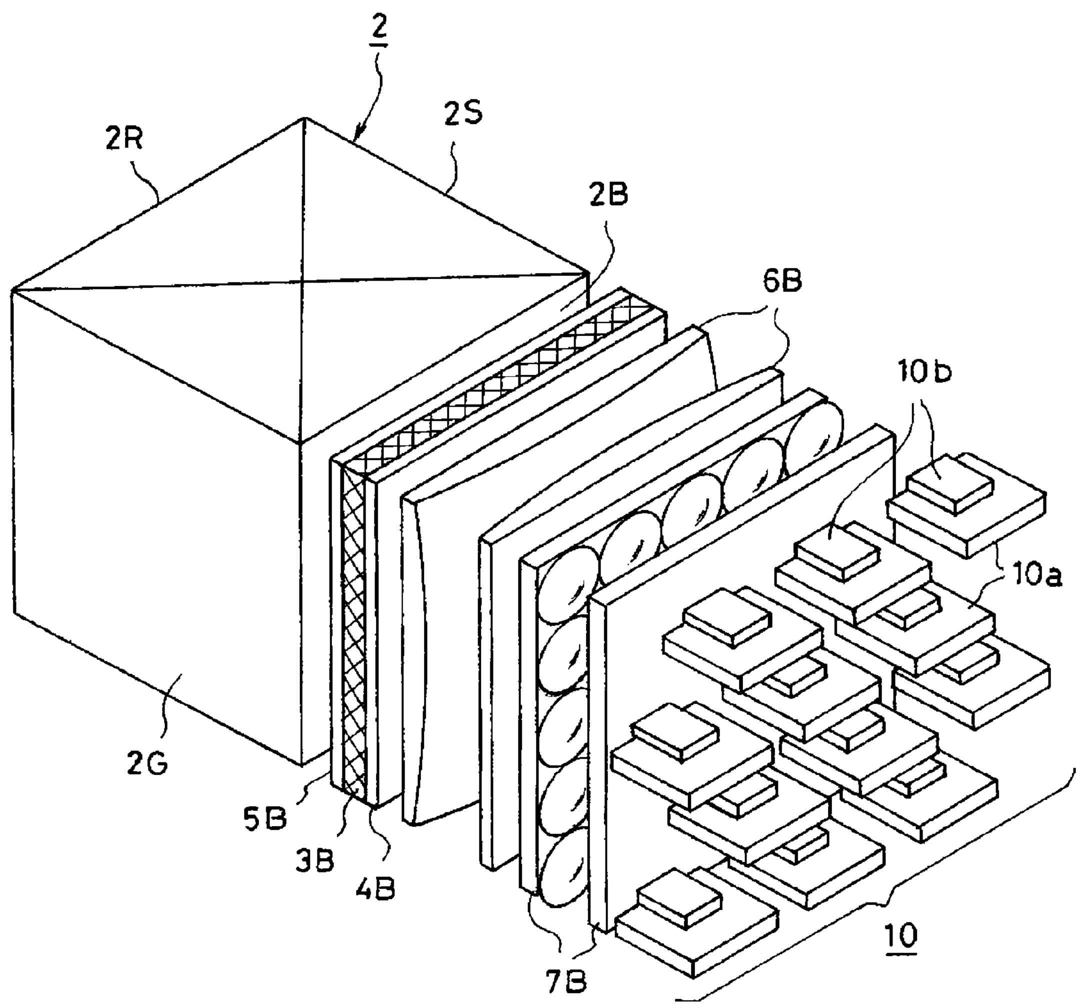
FIG. 2 is a perspective view showing an assembled state of the light source unit according to the present invention.
Figure 3:
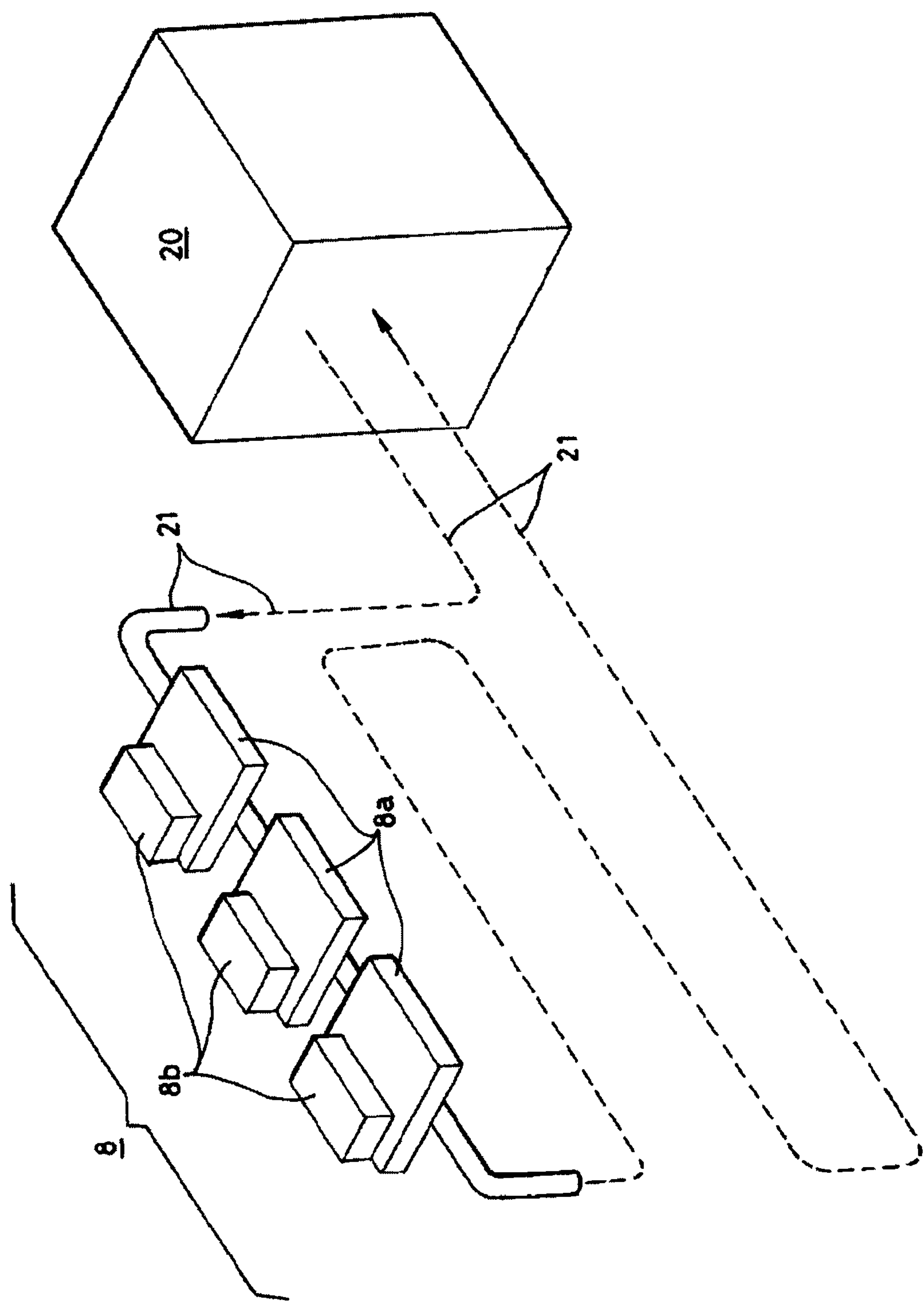
FIG. 3 is a perspective view showing a structure of a principal portion of the light source unit according to the present invention.
Figure 4:
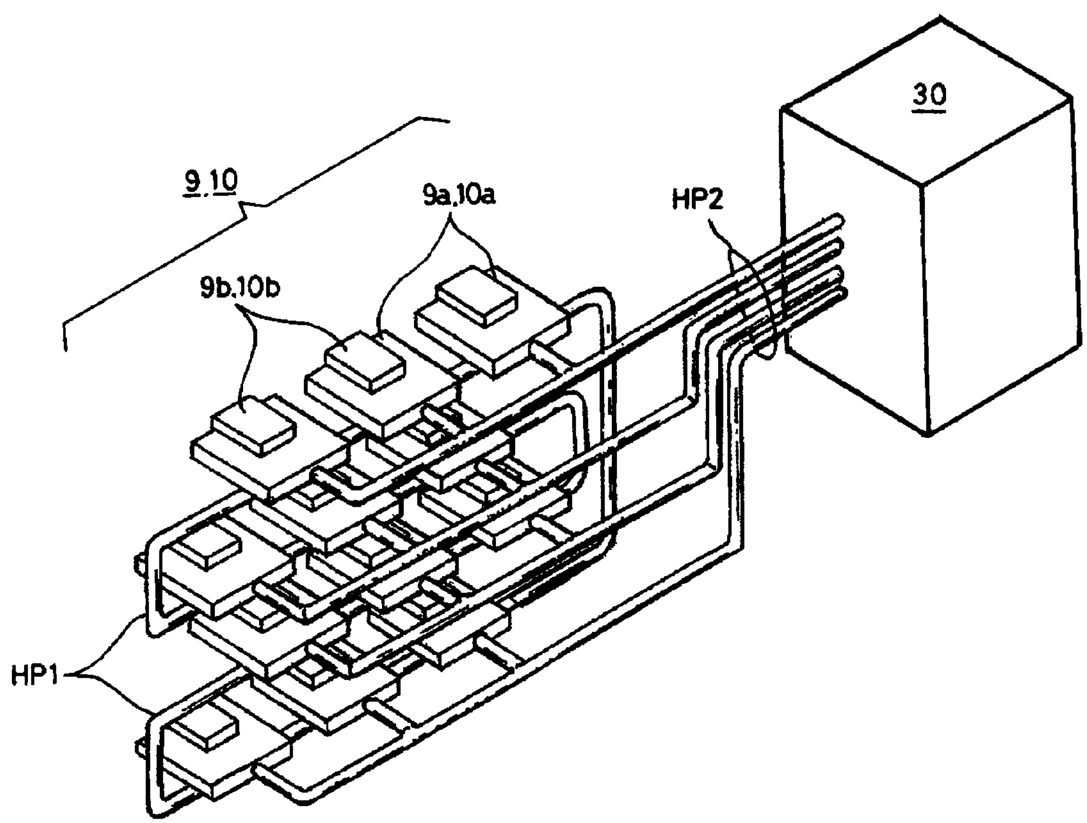
FIG. 4 is a perspective view showing a structure of another principal portion of the light source unit according to the present invention.
Figure 5:
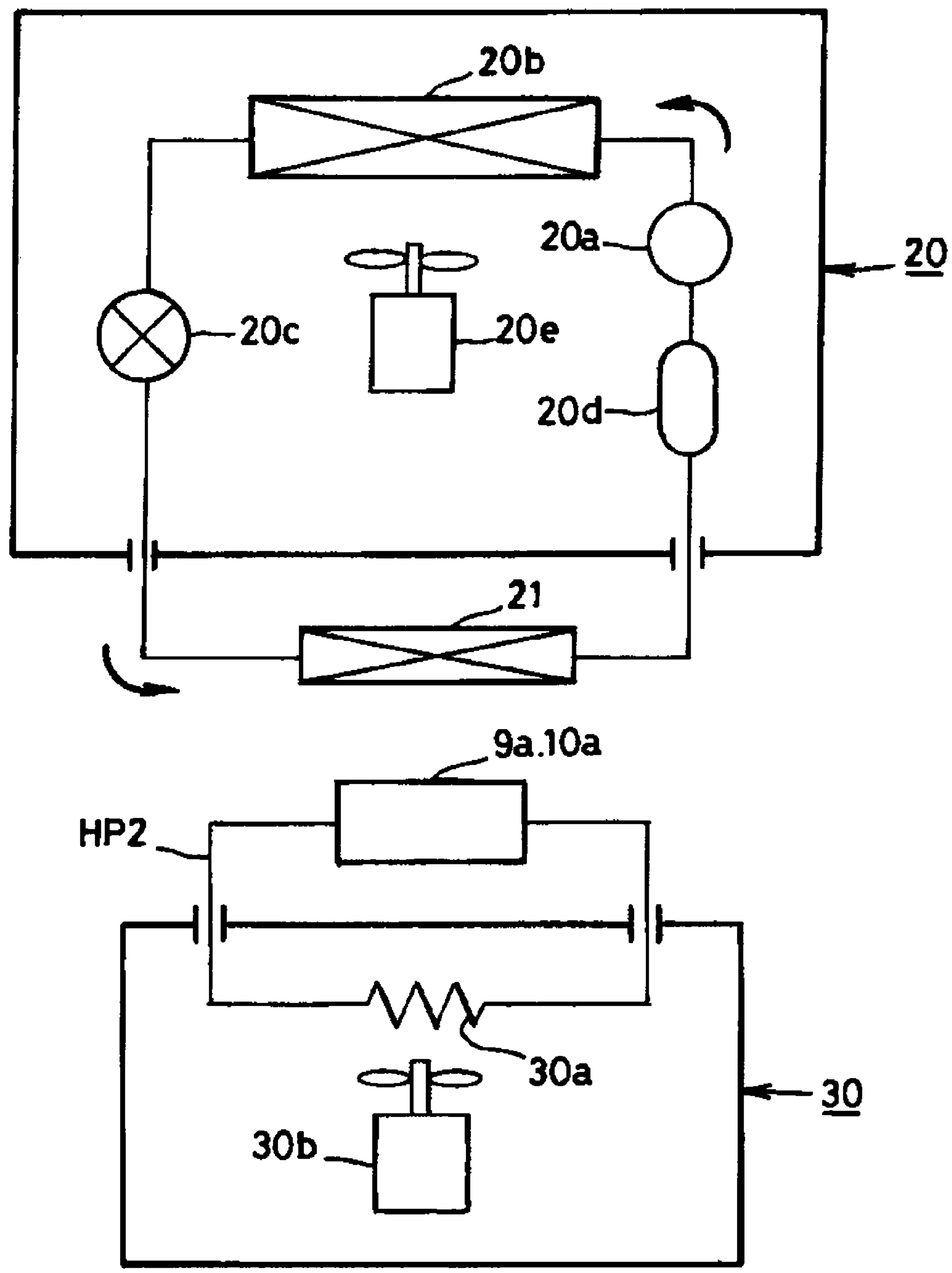
FIG. 5 is a diagram showing an example of refrigerating means and auxiliary cooling means used in the present invention.

An embodiment of the present invention will be described in detail hereinbelow with reference to the accompanying drawings. FIG. 1 is a plan view showing a structure of a light source unit according to the present invention, FIG. 2 shows an assembled state thereof, FIGS. 3 and 4 are perspective views showing structures of principal portions of the light source unit according to the present invention, and FIG. 5 shows an example of refrigerating means and auxiliary cooling means used in the present invention.

FIG. 1 is a plan view showing a structure of a light source unit 1 as a principal portion of a projection type image display device P according to the present invention, in which irradiation surfaces 2R, 2G and 2B for laser beams of three primary colors are formed respectively on three side faces of a synthesizing prism 2 disposed centrally. Red color laser light, green laser light and blue laser light are radiated to the irradiation surfaces 2R, 2G and 2B, respectively.

On the irradiation surfaces 2R, 2G and 2B are disposed LCD panels 3R, 3G and 3B, as well as incidence-side polarizing plates 4R, 4G and 4B and outlet-side polarizing plates 5R, 5G and 5B in facing and parallel relationship. The light beams of the primary colors are arranged in a predetermined polarization direction (p-polarization) in the incidence-side polarizing plates 4R, 4G and 4B in order to let specific linear polarization components be incident on the LCD panels 3R, 3G and 3B, and after the p-polarized light beams have been modulated by the LCD panels 3R, 3G and 3B, only s-polarized light components of the modulated light beams are transmitted through the outlet-side polarizing plates 5R, 5G and 5B.

For attaining a uniform illuminance distribution, condenser lenses 6R, 6G and 6B are disposed in facing and parallel relationship to the incidence-side polarizing plates 4R, 4G and 4B. Further, integrators (fly-eye lens pairs) 7R, 7G and 7B for making the luminances of the laser beams uniform are disposed in facing and parallel relationship to the condenser lenses 6R, 6G and 6B. The integrators 7R, 7G and 7B receive a red laser beam, a green laser beam and blue laser beam respectively from light source elements 8, 9 and 10.

The light source elements 8, 9 and 10 have the same structure. Semiconductor laser arrays 8*b*, 9*b* and 10*b* in which several ten or more semiconductor lasers serving as photoelectric elements are arranged are fixed with, for example, a thermally conductive adhesive to a front end of each of heat receiving plates 8*a*, 9*a* and 10*a* which are formed of metal superior in thermal conductivity. Laser light with a wavelength close to 650 nm which is the wavelength band of red color, laser light with a wavelength close to 550 nm which is the wavelength band of green color, and laser light with a wavelength close to 440 nm which is the wavelength band of blue color, are emitted respectively from the semiconductor laser arrays 8*b*, 9*b* and 10*b*.

The laser beams of the primary colors emitted from the thus constructed semiconductor laser arrays 8*b*, 9*b* and 10*b* must be incident each at a predetermined quantity of light on the synthesizing prism 2. Therefore, it is an important subject of design to take into account the amount of light emitted from each semiconductor laser for each primary color and determine the number of semiconductor lasers to be arranged or set and supply a pulsating current for each of the three primary colors.

The light source elements 8, 9 and 10 are constructed as above. As shown in FIG. 2, plural light source elements 8, 9 and 10 each emitting light of the same primary color within the same primary color irradiation range are arranged hierarchically toward the irradiation surfaces 2R, 2G and 2B of the synthesizing prism 2. In the same figure, there is illustrated an arranged state of the light source elements 10 which emit light of blue color toward the irradiation surface 2B of the synthesizing prism 2. Also as to the light source elements 8 and 9 adapted to emit light of red color and light of green color respectively, they are arranged toward the irradiation surfaces 2R and 2G, respectively. It is necessary that the stages of the light source elements 8, 9 and 10 constituting the hierarchy be arranged, for example, in a zigzag manner so that the irradiation light is dispersed.

When the light source unit 1 thus constructed is driven, laser beams of three primary colors are emitted from the light source elements 8, 9 and 10 toward the irradiation surfaces 2R, 2G and 2B of the synthesizing prism 2. The luminances of the laser beams are rendered uniform in the integrators 7R, 7G and 7B and further the laser beams become uniform in illuminance distribution in the condenser lenses 6R, 6G and 6B to be incident on the incidence-side polarizing plates 4R, 4G and 4B, respectively.

The laser beams of the three primary colors thus rendered uniform are incident on the LCD panels 3R, 3G and 3B and are subjected to gradation (intensity) modulation for forming an image, then are directed to the synthesizing prism 2 through the outlet-side polarizing plates 5R, 5G and 5B. The laser beams of the three primary colors after the gradation modulation are synthesized by the synthesizing prism 2. The output light goes out from an outlet surface 2S and is projected onto a screen through a projection lens L.

In the light source unit 1 thus constructed, for cooling the light source elements 8, 9 and 10 in accordance with the present invention, since the light source elements 8 emitting red color are the most strict in temperature control, the heat receiving plates 8*a* of the light source elements 8 are fixed using suitable means such as brazing, as shown in FIG. 3, to refrigerant pipes 21 which is extended from a refrigerating machine 20 as shown in FIG. 1 and constitutes an evaporator.

FIG. 5 shows an example of a refrigerating machine 20 for supplying refrigerant to the light source elements 8 constructed as above. A refrigerant compressor 20*a*, a condenser 20*b*, a pressure reducing device 20*c*, refrigerant pipes 21 constituting an evaporator, and an accumulator 20*d*, are connected in this order annularly. Gaseous refrigerant of a high temperature and high pressure compressed by the refrigerant compressor 20*a* in this refrigerant circuit is heat-exchanged with the outside air (in case of air cooling) by a blast fan 20*e* of the condenser 20*b* and becomes liquid refrigerant of a high temperature and high pressure.

Next, the liquid refrigerant is throttled and expanded by the pressure reducing device 20*c* into a gas-liquid two-phase refrigerant of low temperature and low pressure, which is then evaporated while being held at low temperature and low pressure by the refrigerant pipes 21 constituting the evaporator and becomes gaseous refrigerant. At this time, the heat receiving plates 8*a* are cooled by evaporative latent heat. By adjusting the number of revolutions of the refrigerant compressor 20*a*, the amount of throttling in the pressure reducing device 20*c* and the air volume in the blast fan 20*e*, it is possible to adjust the cooling capacity of the heat receiving plates 8*a* and perform cooling to a desired temperature.

FIG. 4 shows an example of a structure for cooling the light source elements 9 and 10. The heat receiving plates 9*a* and 10*a* are fixed by suitable means such as brazing to thermal equilibrium heat pipes HP1 for making the heat receiving plates 9*a* and 10*a* uniform in temperature. Further, one ends of radiating heat pipes HP2 are fixed to the heat receiving plates 9*a* and 10*a* and opposite ends thereof are extended to an air cooling device 30 serving as auxiliary cooling means. As shown in FIG. 5, the radiating heat pipes HP2 extended to the air cooling device 30 are connected to a radiator 30*a* which is cooled by a blast fan 30*b*. Transported heat of the heat receiving plates 9*a* and 10*a* is dissipated in the radiator 30*a*, whereby the heat receiving plates 9*a* and 10*a* can be cooled.

Thus, according to the present invention, light source element relatively much in the amount of heat generated are cooled by the refrigerating means, while the other light source elements are cooled by auxiliary cooling means which are not large-scaled, so that there can be attained a rational cooling system free of waste and it is possible to reduce the manufacturing cost and the electric power cost. Thus, the effects peculiar to the present invention can be attained.

Although there has been described an example of adopting transmissive LCD panels in the above embodiment, also in the case where a 3-CCD or a single-CCD light source unit is constructed using reflective LCD panels as alternative display elements for example, it is possible to obtain equal effects. Further, although in the above embodiment, reference has been made as an example to a projection type image display device using semiconductor lasers as light emitting elements, the present invention can be practiced without being limited to the type of light emitting elements.

What is claimed is:

1. A projection type image display device for modulating light beams of at least three primary colors in accordance with image information and synthesizing the modulated light beams to attain projection light, comprising:

a light source unit constituted by arranging a plurality of light source elements hierarchically so as to conduct the light beams of the colors to irradiation surfaces of a synthesizing prism, the light source elements comprising light source arrays each having plural light emitting elements arranged on one and same substrate, the light source arrays being arranged on heat receiving plates respectively;

a refrigerating unit including at least a refrigerant compressor compressing a gaseous refrigerant, a condenser condensing the gaseous refrigerant compressed by the refrigerant compressor into a liquid refrigerant, a pressure reducing device throttling and expanding the liquid refrigerant into a gas-liquid two-phase refrigerant, and an accumulator connected with the refrigerant compressor;

a refrigerant pipe constituting an evaporator evaporating the gas-liquid two-phase refrigerant into the gaseous refrigerant, and the refrigerant pipe constituting the evaporator extending from the refrigerating means and connecting both the pressure reducing device and the accumulator to form a refrigerating circuit with the refrigerating unit;

an auxiliary cooling unit less in cooling capacity than the refrigerating unit; and radiating heat pipes extending to the auxiliary cooling unit, wherein heat receiving plates arranging light source arrays relatively more in the amount of heat generated among the plural light source arrays are fixed with the refrigerant pipe constituting the evaporator, while heat receiving plates arranging the others among the plural light source arrays are fixed with the radiating heat pipes extending to the auxiliary cooling unit and are connected to each other by thermal equilibrium heat pipes for making the heat receiving plates uniform in temperature.

2. A projection type image display device according to claim 1, wherein the light source arrays relatively more in the amount of heat generated are light source arrays emitting red color.

3. A projection type image display device according to claim 1, wherein the auxiliary cooling means is an air cooling device.

4. A projection type image display device according to claim 1, wherein the refrigerating unit further comprises an air supply for supplying air, and the heat receiving plates arranging the light source arrays relatively more in the amount of heat generated is cooled at a desired temperature by adjusting a number of revolutions of the refrigerant compressor, an amount of throttling in the pressure reducing device and an air volume in the air supply.

5. A projection type image display device according to claim 2, wherein the refrigerating unit further comprises an air supply for supplying air, and the heat receiving plates arranging the light source arrays relatively more in the amount of heat generated is cooled at a desired temperature by adjusting a number of revolutions of the refrigerant compressor, an amount of throttling in the pressure reducing device and an air volume in the air supply.

6. A projection type image display device according to claim 3, wherein the refrigerating unit further comprises an air supply for supplying air, and the heat receiving plates arranging the light source arrays relatively more in the amount of heat generated is cooled at a desired temperature by adjusting a number of revolutions of the refrigerant compressor, an amount of throttling in the pressure reducing device and an air volume in the air supply.

* * * * *